US007319556B1

(12) United States Patent
Ackermann et al.

(10) Patent No.: US 7,319,556 B1
(45) Date of Patent: Jan. 15, 2008

(54) WIDE FIELD OF VIEW TELESCOPE

(75) Inventors: Mark R. Ackermann, Albuquerque, NM (US); John T. McGraw, Placitas, NM (US); Peter C. Zimmer, Albuquerque, NM (US)

(73) Assignee: Sandia Corporation

( * ) Notice: Subject to any disclaimer, the term of this patent is extended or adjusted under 35 U.S.C. 154(b) by 224 days.

(21) Appl. No.: 10/952,025

(22) Filed: Sep. 28, 2004

(51) Int. Cl.
*G02B 17/00* (2006.01)
(52) U.S. Cl. ..................... 359/366; 359/859
(58) Field of Classification Search ............. 359/366, 359/859, 365, 861
See application file for complete search history.

(56) References Cited

U.S. PATENT DOCUMENTS

| 4,226,501 | A | | 10/1980 | Shafer | |
|---|---|---|---|---|---|
| 4,733,955 | A | * | 3/1988 | Cook | 359/859 |
| 4,804,258 | A | | 2/1989 | Kebo | |
| 5,142,417 | A | * | 8/1992 | Brunn | 359/859 |
| 5,331,470 | A | * | 7/1994 | Cook | 359/859 |
| 5,640,283 | A | * | 6/1997 | Warren | 359/859 |
| 5,905,591 | A | * | 5/1999 | Duncan et al. | 359/399 |
| 6,072,852 | A | * | 6/2000 | Hudyma | 378/34 |
| 6,902,282 | B2 | * | 6/2005 | Cook | 359/859 |
| 6,969,840 | B1 | | 11/2005 | Theriault et al. | 250/216 |
| 2003/0035232 | A1 | * | 2/2003 | Sasaki | 359/859 |
| 2003/0169493 | A1 | * | 9/2003 | Draganov et al. | 359/399 |
| 2003/0179444 | A1 | * | 9/2003 | Cook | 359/366 |
| 2004/0095567 | A1 | * | 5/2004 | Ohsaki et al. | 355/67 |
| 2005/0036219 | A1 | * | 2/2005 | Doittau et al. | 359/859 |
| 2005/0094257 | A1 | * | 5/2005 | Sasaki | 359/366 |

FOREIGN PATENT DOCUMENTS

WO WO03054609 * 3/2003

OTHER PUBLICATIONS www.bobmay.astronomy.net/Mersn, "The Mersenne-Schmidt: A Three-Mirror Survey Telescope" from Monthly Notes of the Royal Astronomical Society (1984), pp. 597-609, vol. 210.
LSST.org, "LSST Design—Three-Mirror Telescope Design", www. LSST.org/Design, date unknown.
"Paraxial Optics", www.sinop.com/software, Sinclair Optics, Inc., Jun. 1, 1997.
www.bobmay.astronomy.net/Mersnintro, "Mersenne-Schmidt Telescope Article", from Monthly Notes of the Royal Astronomical Society (1965), pp. 411-427, vol. 216.
M. Lampton, et al., "SNAP Telescope", sag-www.ssl.berkeley.edu/nmlampton/SNAP_Telescope.pdf.
G. Moretto, et al., "Aplanatic Corrector Designs for the Extremely Large Telescope", Applied Optics, Jun. 2000, pp. 2805-2812, vol. 39, No. 16.

(Continued)

*Primary Examiner*—Stephone B. Allen
*Assistant Examiner*—Lee Fineman (57) ABSTRACT

A wide field of view telescope having two concave and two convex reflective surfaces, each with an aspheric surface contour, has a flat focal plane array. Each of the primary, secondary, tertiary, and quaternary reflective surfaces are rotationally symmetric about the optical axis. The combination of the reflective surfaces results in a wide field of view in the range of approximately 3.8° to approximately 6.5°. The length of the telescope along the optical axis is approximately equal to or less than the diameter of the largest of the reflective surfaces.

28 Claims, 12 Drawing Sheets

OTHER PUBLICATIONS

A. Rakich, "Four Families of Flat-Field Three-Mirror Anastigmatic Telescopes with Only One Mirror Aspherised", Proceedings of the SPIE, Jul. 9, 2002, pp. 32-40, vol. 4768.

KiwiStar Optics, Industrial Research Limited—KiwiStar Optics—"Achieving Optimum Optical Solutions" (advertisement), www.irl.cri.nz, New Zealand.

* cited by examiner

OPTICAL PRESCRIPTION DATA FOR 3.5m APERTURE, f=1.5, 4.0 DEGREE FOV
FOUR MIRROR TELESCOPE

| SURFACE NUMBER | SURFACE TYPE | SURFACE NAME | RADIUS OF CURVATURE | THICKNESS | GLASS | DIAMETER | CONIC CONSTANT |
|---|---|---|---|---|---|---|---|
| STOP | EVENASPH | PRIMARY | -6433.974 | -1405.031 | MIRROR | 3500 | -1.123517 |
| 2 | EVENASPH | SECONDARY | -3745.918 | 1405.031 | MIRROR | 2099.999 | 3.083615 |
| 3 | EVENASPH | TERTIARY | -4986.262 | -1405.031 | MIRROR | 2362.087 | 3.026096 |
| 4 | EVENASPH | QUATERNARY | -11308.44 | 1183.286 | MIRROR | 1136.951 | 120.0527 |
| IMAGE | FLAT | FOCAL PLANE | INFINITY | | | 367.9504 | 0 |

| ASPHERIC COEFFICIENT | PRIMARY | SECONDARY | TERTIARY | QUATERNARY |
|---|---|---|---|---|
| A2 | 0 | 0 | 0 | 0 |
| A4 | 1.03E-13 | 7.42E-12 | -1.58E-12 | -2.08E-11 |
| A6 | -1.51E-20 | -7.57E-20 | -2.39E-19 | -4.88E-18 |
| A8 | -4.00E-28 | 1.07E-25 | 5.46E-26 | 1.91E-24 |
| A10 | 9.23E-36 | 1.32E-32 | -1.74E-33 | 0 |

FIG.12A

OPTICAL PRESCRIPTION DATA FOR 0.5m APERTURE, f=1.5, 5.5 DEG FIELD OF VIEW FOUR MIRROR TELESCOPE

| SURFACE NUMBER | SURFACE NAME | SURFACE TYPE | RADIUS OF CURVATURE | THICKNESS | GLASS | DIAMETER | CONIC CONSTANT |
|---|---|---|---|---|---|---|---|
| STOP | PRIMARY | EVENASPH | −879.0625 | −201.7787 | MIRROR | 500 | −1.063812 |
| 2 | SECONDARY | EVENASPH | −528.4286 | 201.7787 | MIRROR | 298.2584 | 3.210228 |
| 3 | TERTIARY | EVENASPH | −752.9806 | −201.7787 | MIRROR | 329.9805 | 3.730896 |
| 4 | QUATERNARY | EVENASPH | −1756.403 | 137.7734 | MIRROR | 160 | 87.78856 |
| IMAGE | FOCAL PLANE | FLAT | INFINITY | | | 72.77914 | 0 |

| ASPHERIC COEFFICIENT | PRIMARY | SECONDARY | TERTIARY | QUATERNARY |
|---|---|---|---|---|
| A2 | 0 | 0 | 0 | 0 |
| A4 | 6.26E-12 | 2.62E-09 | −1.02E-09 | −1.45E-08 |
| A6 | −2.52E-16 | −6.23E-16 | −4.25E-15 | −2.75E-13 |
| A8 | −2.51E-22 | 1.20E-19 | 7.70E-20 | −1.23E-18 |
| A10 | 1.72E-28 | 9.26E-25 | −3.24E-25 | −4.63E-22 |

WIDE FIELD OF VIEW TELESCOPE

GOVERNMENT RIGHTS

The wide field of view telescope described herein was developed under Contract DE-AC04-94AL850000 between Sandia Corporation and the U.S. Department of Energy. The U.S. Government has certain rights in the invention.

BACKGROUND

1. Field

The method and system herein relates to telescopes, and more specifically to a wide field of view reflective telescope having a flat focal plane array.

2. Related Art

Classically, space situational awareness includes two rather separate functions: surveillance to detect orbiting objects, and tracking observations to confirm and characterize the object, and provide data from which its function and operational state can be inferred. At times it is desirable to use passive, all-optical techniques for space situational awareness. Tracking is relatively simple once a satellite's ephemeris is known. However, finding unknown objects requires a blind search, undirected by prior knowledge of orbital elements, size, compositions, or aspect. This is observationally intensive and slow. At present, optical tracking systems look for satellites in higher orbits where their angular rate relative to a ground observer is comparatively slow.

However, most satellites are located in lower altitudes. Approximately 80% of all satellites are located at or below 1250 km above the surface of the earth. Objects in low earth orbit (LEO) pose a significant challenge to a blind search as they move at high angular rates, in many cases—due to size or reflection characteristics—represent dim targets, and the effective field of view for telescopes at low altitudes is quite restricted.

There are optical systems that search for orbiting objects, though historically, for LEO objects this function has been largely fulfilled by radar systems. It would be prudent to use available technology to advance space situational awareness, including passive optical systems.

Micro-, pico-, and nano-satellites in low earth orbit pose an interesting challenge for passive optical detection and tracking. In general a micro-satellite would be expected to have linear dimensions somewhere between about 10 cm and 30 cm. Such objects have visual signatures in the range of $12^{th}$ to $16^{th}$ magnitude when viewed in terminator at a range of 500 km. While not extremely dim, micro-satellites represent a challenging target for smaller telescopes. Nonetheless, optical components of the Space Surveillance Network (SSN) Ground Based Electro-optical Deep Space Surveillance (GEODSS) telescope and other telescopes operated for deep space searching frequently detect and produce track information for even dimmer satellites, but they do so only for objects in high orbits. The most difficult problem posed by microsatellites is that of blind optical search for systems in LEO.

When working at LEO altitudes optical telescopes encounter two significant difficulties. While the satellites are close and therefore slightly brighter, by Kepler's Third Law they move more rapidly than at higher altitudes and the effective field of view of the telescope is decreased. While the first problem is simple physics, the second is one of relative angles and is not entirely intuitive.

A telescope field of view (FOV) is determined by its design parameters including the effective focal length, charge-coupled device (CCD) size, and impact of vignetting. While a 5° FOV telescope will see a patch of sky 5° across, it will not observe the equivalent angular extent of a LEO satellite orbit. According to simple geometry, arc length is the product of angle and distance, such as ArcLength=Range*θ. A ground-based telescope observing satellites at 500 km can see an arc of length 500*FOV km, but the angular sweep of a satellite moving through this same distance is much less than the telescope FOV.

Satellite motion is defined relative to the center of the earth. Hence, the angular sweep for the satellite crossing the telescope FOV is given as $\theta_{orbit}$=500*FOV/(500+EarthRadius). As these arcs are short and LEO satellites move quickly, the transit time along this arc will be brief. This results in the angular velocity of a LEO satellite through a telescope FOV quite high. For example, while a geosynchronous satellite appears motionless, a LEO bird appears to move at more than 228 arc seconds per second, a rate more than 15 times greater than stars appear to move across the sky.

Of the many telescopes in operation world wide, few are dedicated to wide area search. Even within the U.S. Air Force, where several moderate aperture telescopes are available, most are narrow FOV instruments. The U.S. Air Force GEODSS program has the only telescopes dedicated to wide-area satellite search. Outside of the U.S. government, other capabilities exist but these are largely dedicated to astronomical sky surveys and the search for near earth objects (NEOs). These surveys all have some inherent capability to detect slow moving satellites but with few exceptions. Most surveys ignore satellites while some actually find them to be an impediment. All of these systems cold detect the streak of a bright LEO satellite that happens to pass through the FOV, but none are optimized for detecting the very brief streaks of dim LEO objects.

A need exists for a system of wide field of view telescopes for finding LEO satellites and space objects, which are often difficult to detect and track, as well as for astronomical research. Such a system could be used to generate initial track information sufficient for acquisition and fine tracking by more traditional slewing telescopes.

SUMMARY

The wide field of view telescope described herein includes four reflective surfaces: a primary, secondary, tertiary, and quaternary reflective surface, each having an aspheric surface contour. The primary, secondary, tertiary, and quaternary reflective surfaces are rotationally symmetric about an optical axis and a flat focal plane array is created by these surfaces. The primary reflective surface is concave; the secondary reflective surface is convex, the tertiary reflective surface is concave, and the quaternary reflective surface is convex.

Advantageously, the telescope provides a field of view in the range of approximately 3.8° to approximately 6.5°, and a fast focal ratio. The wide field of view telescope can have an aperture in the range of approximately four inches to approximately ten meters. The length of the telescope along the optical axis is less than or equal to the largest reflective surface diameter.

A method of obtaining a wide field of view telescopic image described herein includes reflecting a ray from a primary reflective concave surface having an aspheric surface contour; reflecting a ray from a secondary reflective convex surface having an aspheric surface contour; reflecting a ray from a tertiary reflective concave surface having an aspheric surface contour; reflecting a ray from a quaternary reflective convex surface having an aspheric surface contour; and creating a flat focal plane array with the primary, secondary, tertiary, and quaternary reflective surfaces. In this method, each of the primary, secondary, tertiary, and quaternary reflective surfaces are rotationally symmetric about an optical axis. The method advantageously includes creating a wide field of view and a fast focal ratio with the reflective surfaces.

A system of wide field of view telescopes described herein comprises a plurality of the wide field of view telescopes. Each of the telescopes in the system includes four reflective surfaces: a primary, secondary, tertiary, and quaternary reflective surface, each having an aspheric surface contour. The primary, secondary, tertiary, and quaternary reflective surfaces are rotationally symmetric about an optical axis and a flat focal plane array is created by these surfaces. The primary reflective surface is concave; the secondary reflective surface is convex, the tertiary reflective surface is concave, and the quaternary reflective surface is convex.

DRAWINGS

Embodiments and data pertaining to the disclosed wide field of view telescope are shown in the following figures, in which like reference numbers and designations indicate like or similar parts.

DETAILED DESCRIPTION

A blind search for LEO satellites requires specialized and dedicated equipment. There are no known practical methods to scan the entire sky, and a random LEO satellite cannot be held motionless on a focal plane array (FPA) long enough to integrate for improved detection probability. Drift scan techniques have been used for debris search but unless the CCD orientation and scan rate are matched to the expected debris trajectory, detection thresholds rapidly degrade.

A better blind search technique would be to fixate upon a portion of the sky in an effort to capture a satellite streaking through the image. With post processing, even image streaks with poor signal to noise ratio (SNR) resulting from very faint satellites are detectable as the probability of a streak not being a satellite decreases rapidly with length. Also, processing with a Hough transform helps to quickly identify streaks. However, to maximize the probability of detection against dim targets it is necessary to match the satellite image to the pixels on the CCD and use the widest possible field of view telescope.

Two important parameters to specify for the design of a wide FOV, LEO space surveillance telescope are detection threshold—in terms of visual magnitude, and sky coverage. The telescope should be capable of detecting LEO satellites at least as dim as $16^{th}$ magnitude. Further, the telescope FOV should be large enough to see the largest practical portion of the sky. Such a wide FOV telescope should have a FOV in the range of 4° to 6.5°.

Another important aspect for the wide FOV telescope is to operate with a flat focal surface. Many optical designs feature wide fields but many also have curved focal surfaces. While some efforts are underway to produce electronic detectors to match a curved focal surface, such approaches are of limited practical value for anything other than research purposes. Regardless, the need for spare cameras and the ability to switch to other sensor bands makes a curved focal surface impractical.

Cost-effectiveness is another consideration for a wide FOV telescope. Passive optical detection is cost-effective, and has the added benefit of returning no information to the satellite and its operators. Passive detection can be implemented with solar illumination, or active illumination—should that technique be necessary or useful.

In addition to optical requirements, the wide FOV telescope should be capable of slewing across the sky at angular rates sufficient to track LEO satellites. Although the wide FOV telescope may stare at specific portions of the sky a majority of the time, the wide FOV telescope system may also be used to acquire then track LEO satellites. To meet this need, a short, compact optical layout has significant advantages. Long optical systems such as those typical for Schmidt cameras and Couder telescopes do not lend themselves to rapid slewing without substantial mounts.

Most conventional telescopes have fields of view much less than 1°. Some survey telescopes have wider fields of view but these are usually Schmidt cameras and Baker-Nunn cameras. While in some cases they have extremely wide fields of view, they usually feature curved focal planes and are not readily adaptable to operation with CCD sensors.

Also, the inclusion of refractive correcting elements limits the aperture to somewhere less than approximately 1.33 m. There are a few survey telescopes with large mirrors and subaperture refractive components but these generally do not have the fields of view of the Schmidt and Baker-Nunn type cameras. Other solutions have limited fields of view, poorer image quality, or curved focal planes (non-zero Petzval radius). Some of these solutions are point solutions where the given design is essentially the best obtainable and slight changes degrade image quality. Point solutions also do not allow for easy switching to other sensor bands. Other solutions are more general but require multiple corrector lenses in the aft end of the image train.

To achieve the detection threshold for detecting LEO objects and their orbits, and for conducting astronomical research, the wide FOV telescope described herein has a aperture anywhere in the range of approximately 4 inches to approximately 10 m, with a minimum of refractive components. The wide FOV telescope is of short, compact design, and includes the ability to switch sensor bands from visible to somewhere within the infrared. A modified Paul system is implemented having a flat focal plane, fast focal ratio, scalable to moderate apertures with wide fields of view, and requiring no transmissive components. However, the telescope design can be modified to include filters and a dewar window if necessary, as will be readily apparent to those skilled in the art.

FIGS. 1 through 9 provide various 4-surface configurations for a single wide FOV telescope of a system of wide FOV telescopes for detecting LEO objects, determining LEO object orbits, and for conducting astronomical research. These arrangements depict four reflective surfaces having an aspheric surface contour, designated M1, M2, M3, and M4, each being rotationally symmetric about the optical axis, and arranged in different locations along the optical axis. Four mirrors are used to control the Petzval radius. This quantity of mirrors provide a broad family of solutions which simultaneously correct four third-order aberrations of spherical aberrations, coma, astigmatism, an field curvature over an extremely wide field of view for large aperture telescopes. A wide FOV and flat focal plane is achieved regardless of the location of the four curved surfaces along the optical axis shown in FIGS. 1 through 9. The overall length along the optical axis from the first to the last mirror surface of the wide FOV telescope shown in FIGS. 1 through 9 is on the order of, or less than, the diameter of the largest mirror surface.

As shown in FIGS. 1-9, this wide-field-of-view telescope is a direct-imaging optical system where only a single image is formed between the light input location and the flat focal plane where the single image is formed. As shown in the figures, it is not a relayed optical system, where an intermediate image is formed between the light input location and the location of the final image that is formed as output from the relayed optical system.

Figure 1:
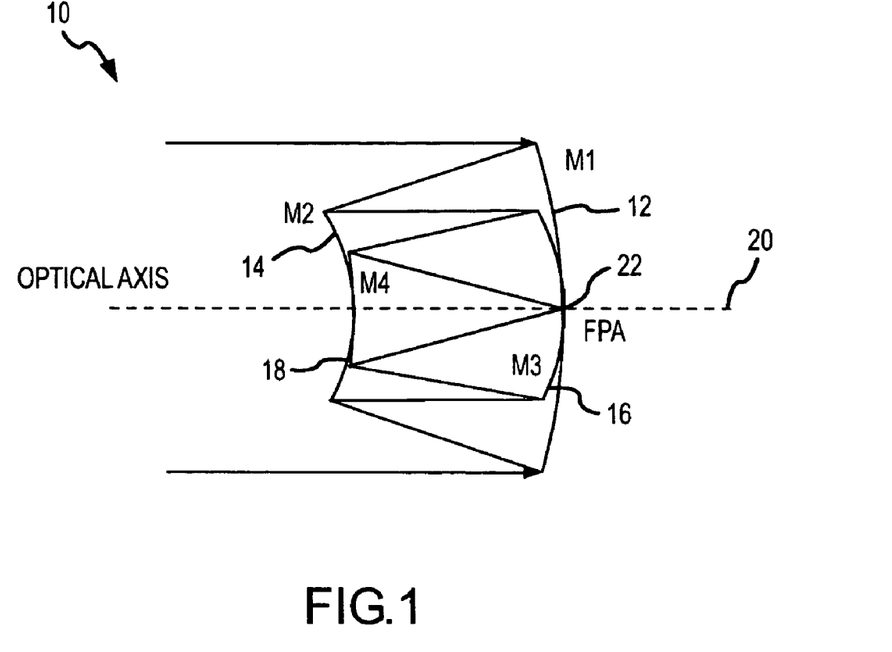
FIG. 1 is a first configuration for a wide field of view telescope.

A first configuration for the wide FOV telescope is shown in FIG. 1. Referring to FIG. 1, a side-view, ray trace diagram illustrates a telescope 10 having four curved surfaces designated M1, M2, M3, and M4, where M1 represents the primary surface 12, M2 represents the secondary surface 14, M3 represents the tertiary surface 16, M4 represents the quaternary surface 18. Each surface comprises a mirror of successively smaller diameter, wherein the primary surface is of the largest diameter and the quaternary surface is of the smallest diameter. In this embodiment, surfaces M1 and M3 are co-located, and surfaces M2 and M4 are co-located and negatively offset along the optical axis from M1 and M3.

Figure 10:
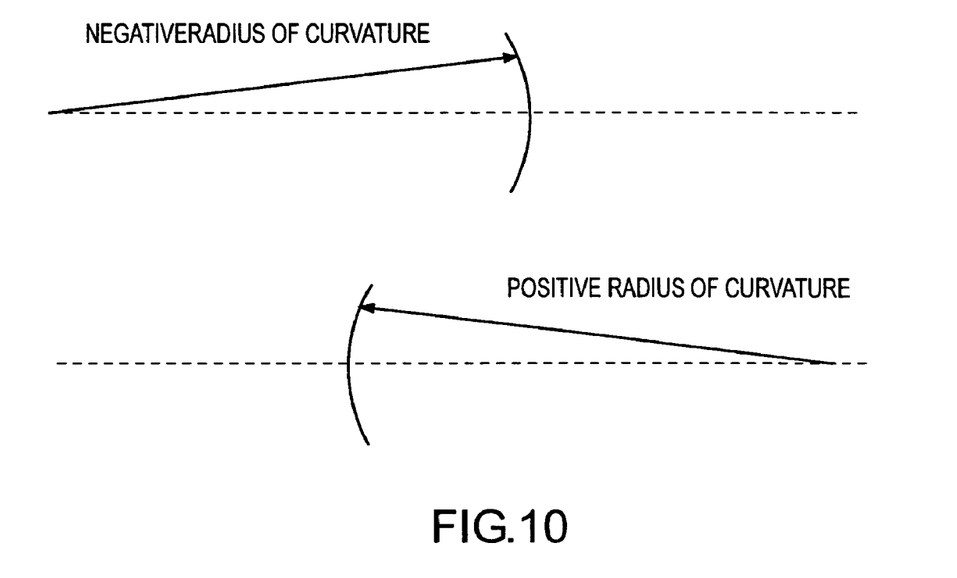
FIG. 10 defines a negative radius of curvature and a positive radius of curvature.

The mirrors are rotationally symmetric about the optical axis 20, and the flat focal plane array (FPA) 22 is on the optical axis 20. Each surface has a negative radius of curvature, resulting in the light first encountering a concave surface, followed by a convex surface, then concave surface, and lastly a convex surface. Turning briefly to FIG. 10, a diagram illustrates the difference between a negative and positive radius of curvature.

Figure 2:
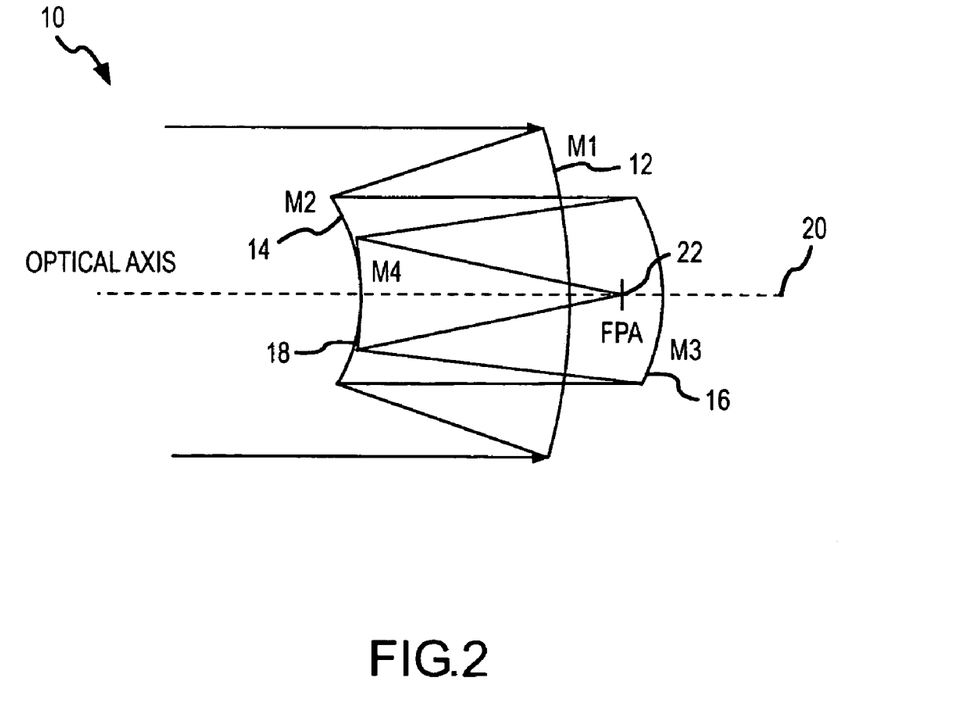
FIG. 2 is a second configuration for a wide field of view telescope.

Turning back to FIG. 2, another configuration of the wide FOV telescope 10 is shown. FIG. 2 also provides a side-view, ray trace diagram illustrating a telescope 10 having four curved surfaces designated M1, M2, M3, and M4, where M1 represents the primary surface 12, M2 represents the secondary surface 14, M3 represents the tertiary surface 16, and M4 represents the quaternary surface 108. In this embodiment, surfaces M2 and M4 are co-located, while M1 and M3 are not. The mirrors are rotationally symmetric about the optical axis 20, and the focal plane array (FPA) 22 is on the optical axis. Each surface has a negative radius of curvature.

Figure 3:
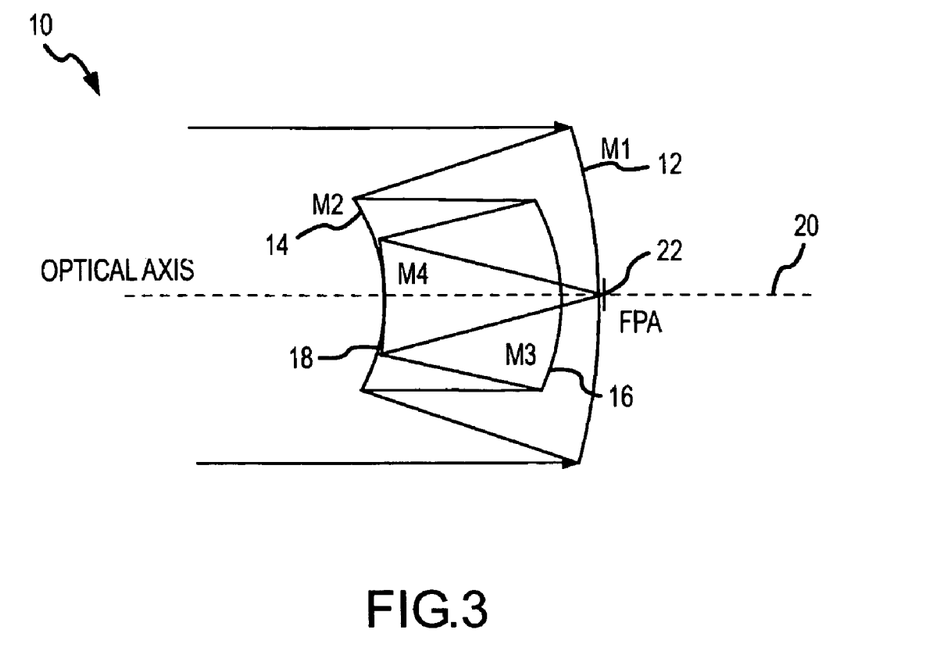
FIG. 3 is a third configuration for a wide field of view telescope.

FIG. 3 provides another configuration of the wide FOV telescope 10 wherein surfaces M2 and M4 are co-located, while M1 and M3 are not. This configuration is similar to FIG. 2 except that the positions of M1 and M3 are reversed. The mirrors are rotationally symmetric about the optical axis 20, and the focal plane array (FPA) 22 is on the optical axis. Each surface has a negative radius of curvature.

Figure 4:
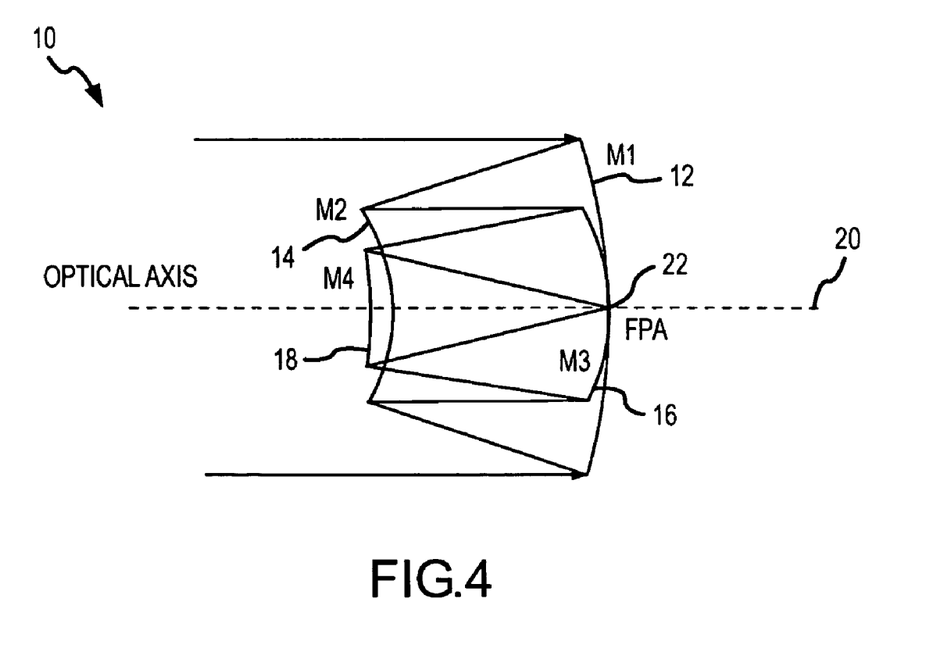
FIG. 4 is a fourth configuration for a wide field of view telescope.
Figure 5:
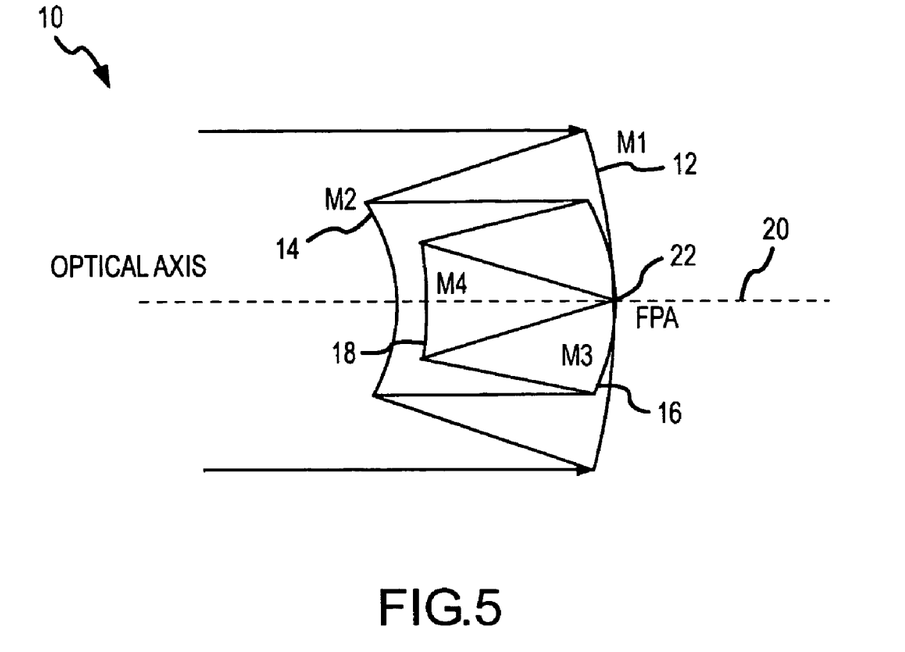
FIG. 5 is a fifth configuration for a wide field of view telescope.

FIG. 4 is another configuration of the wide FOV telescope 10 wherein surfaces M1 and M3 are co-located, while M2 and M4 are not. The mirrors are rotationally symmetric about the optical axis 20, and the focal plane array (FPA) 22 is on the optical axis. Each surface has a negative radius of curvature. FIG. 5 is yet another configuration of the wide FOV telescope 10, similar to that of FIG. 4 wherein surfaces M1 and M3 are co-located, while M2 and M4 are not. The positions of M2 and M4 are reversed from that of FIG. 4.

Figure 6:
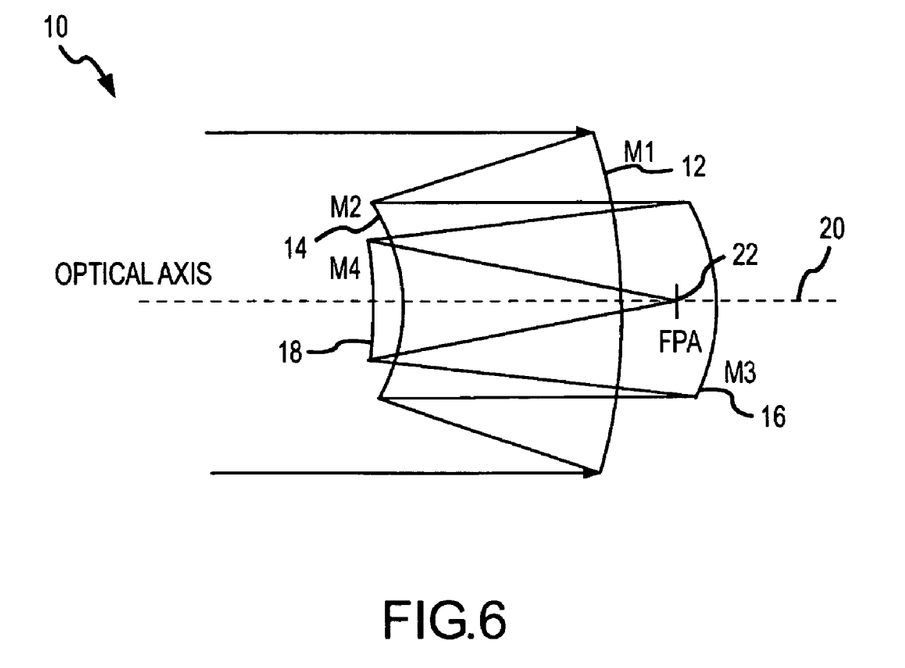
FIG. 6 is a sixth configuration for a wide field of view telescope.
Figure 7:
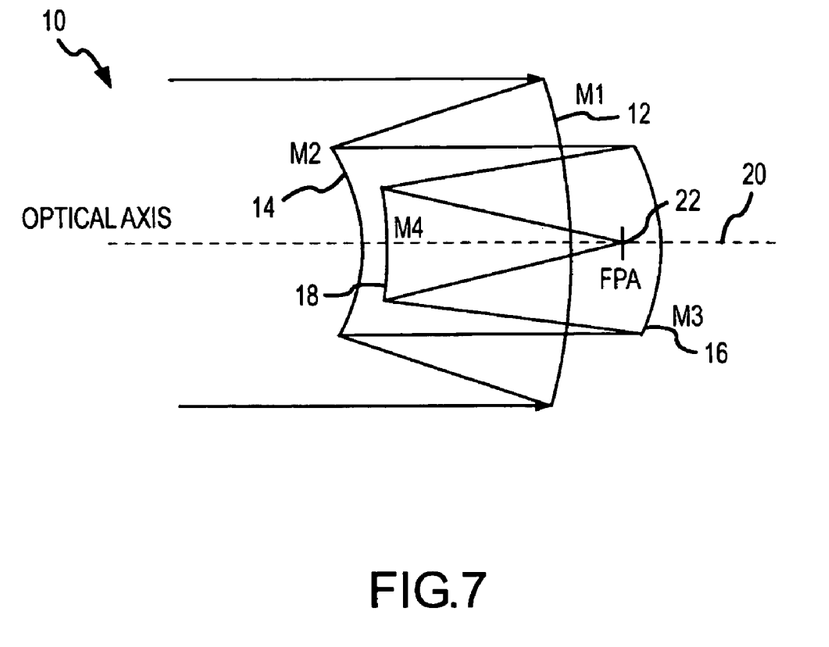
FIG. 7 is a seventh configuration for a wide field of view telescope.
Figure 8:
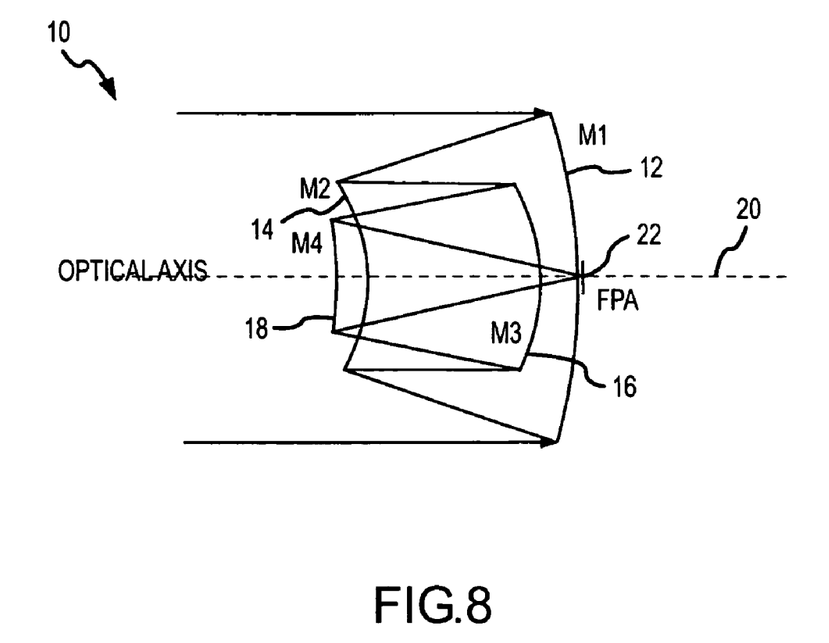
FIG. 8 is a eighth configuration for a wide field of view telescope.
Figure 9:
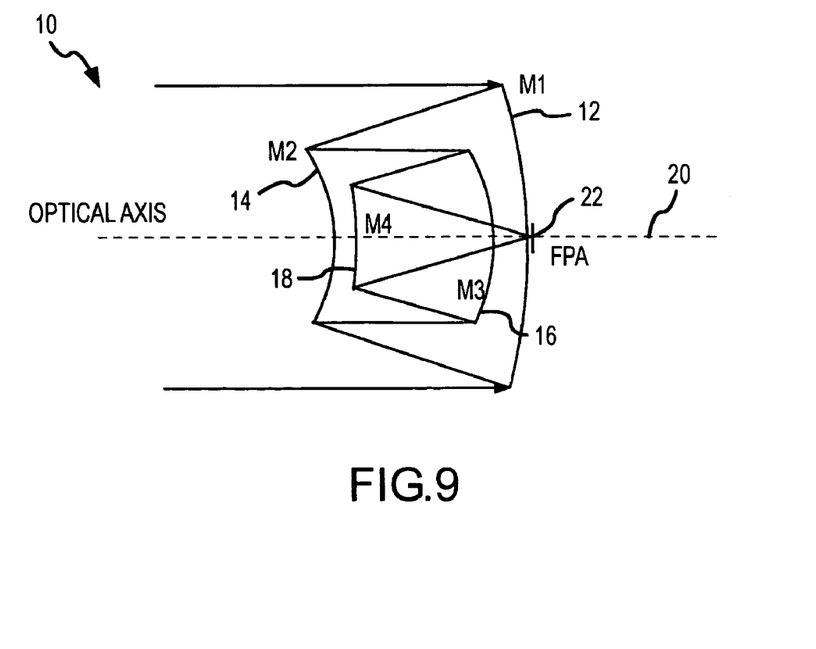
FIG. 9 is a ninth configuration for a wide field of view telescope.

FIGS. 6-9 demonstrate different configurations of the wide FOV telescope surfaces wherein none of the surfaces are co-located. However, the mirrors are still rotationally symmetric about the optical axis 20, and the focal plane array (FPA) 22 is on the optical axis. Each surface has a negative radius of curvature. In FIG. 6 the surfaces are located such that M4 precedes M2, which precedes M1, which precedes M3 along the optical axis 20. In FIG. 7 M2 precedes M4, which precedes M1, which precedes M3 along the optical axis 20. The arrangement depicted in FIG. 8 shows M4 preceding M2, which precedes M3, which precedes M1 along the optical axis 20. FIG. 9 demonstrates a configuration wherein M2 precedes M4, which precedes M3, which precedes M1 along the optical axis 20.

Figure 12A:
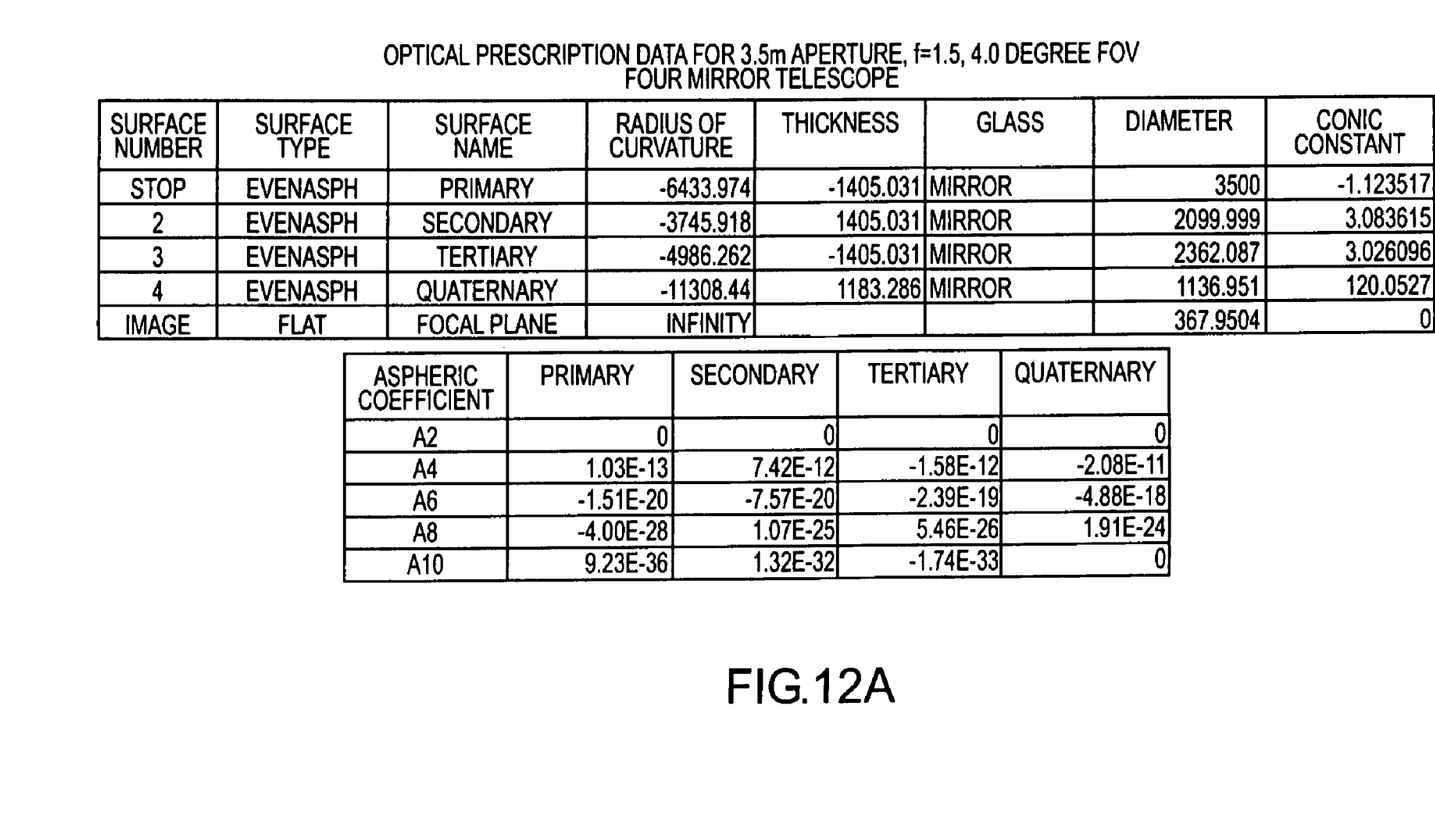
FIG. 12*a* provides optical prescription data for a 3.5 m aperture, 4.0° wide field of view telescope.
Figure 12B:
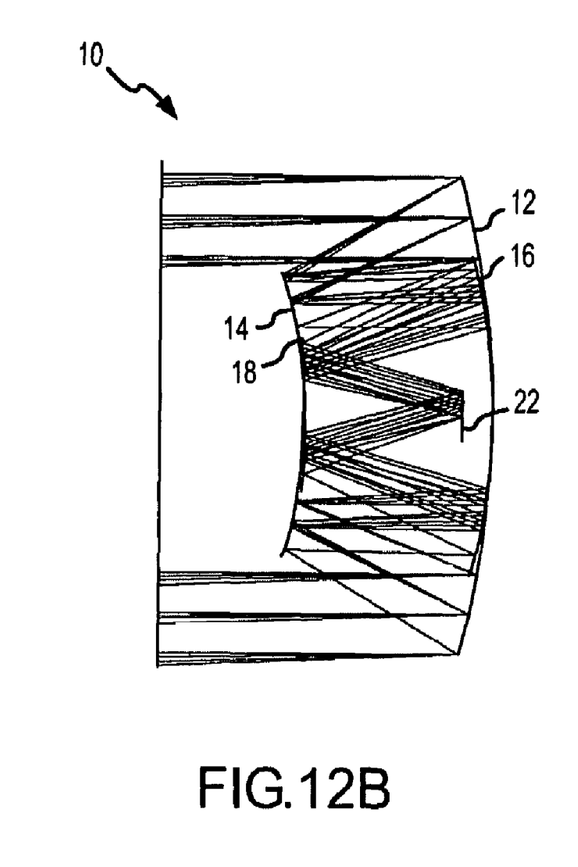
FIG. 12*b* provides a ray trace diagram for the wide field of view telescope of FIG. 12*a*.
Figure 12C:
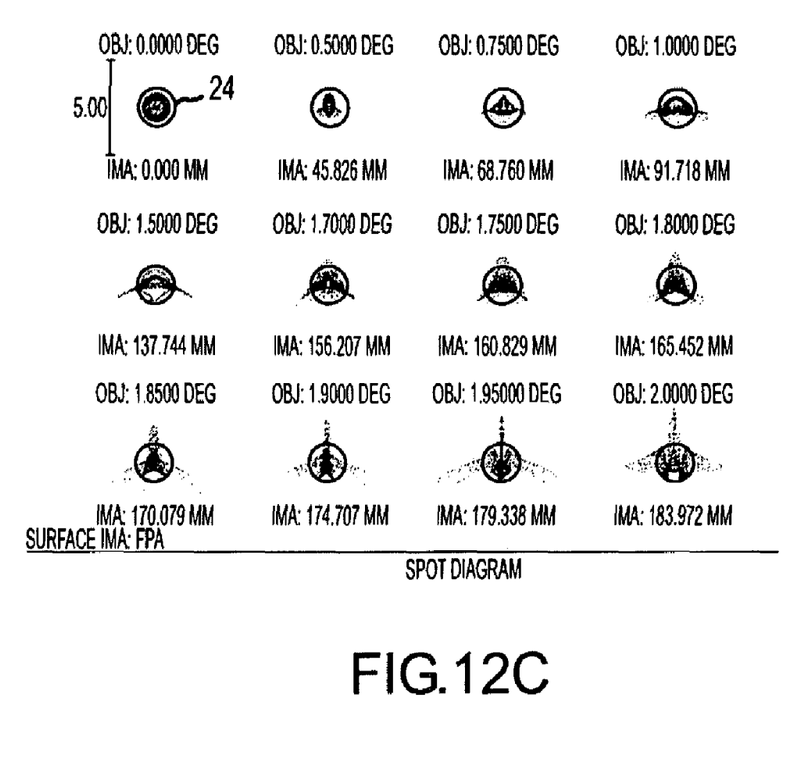
FIG. 12*c* provides spot diagrams for the wide field of view telescope of FIGS. 12*a* and 12*b*.

FIGS. 12a, 12b, and 12c provide optical prescription data, ray trace diagram, and spot diagrams respectively for another wide FOV telescope configuration 10, from commercial optical ray-tracing software. This configuration is similar to the configuration of FIG. 1 except that the diameter of the tertiary surface is slightly larger than that of the secondary surface. The optical prescription data shown in FIG. 12a is for 3.5 m aperture, having a fast focal ratio (f)=1.5, and a 4.0° FOV. The upper chart provides surface number and type, surface name, radius of curvature, surface thickness, type of surface, surface diameter, and conic constant.

Figure 11:
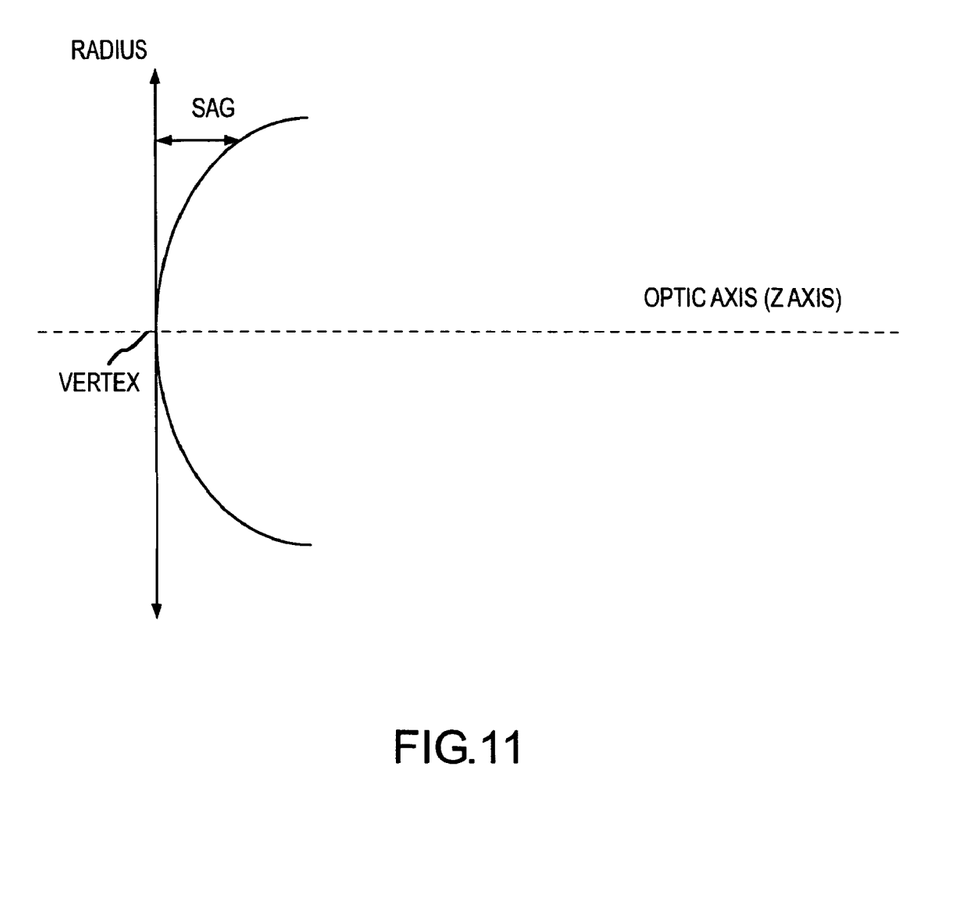
FIG. 11 illustrates the Sag parameter for an optical surface.

The aspheric coefficient for the primary, secondary, tertiary, and quaternary surfaces is provided in the lower chart of FIG. 12a. The equation for Sag (see FIG. 11) for an optical surface is:

$$Z = Sag(r) = \frac{\frac{r^2}{RC}}{1 + \sqrt{1 - (1+k)\left(\frac{r}{RC}\right)^2}} + A_2 r^2 + A_4 r^4 + A_6 r^6 + A_8 r^8 + A^{10} r^{10}, \quad (1)$$

where:
- r=radius, distance from the optic axis
- z=position along the optic axis
- RC=radius of curvature
- k=conic constant
- $A_2$=coefficient for second order aspheric term
- $A_4$=coefficient for fourth order aspheric term
- $A_6$=coefficient for sixth order aspheric term
- $A_8$=coefficient for eighth order aspheric term, and
- $A_{10}$=coefficient for tenth order aspheric term.

FIG. 12b shows the ray trace diagram for the wide FOV telescope 10 having the optical prescription data represented in FIG. 12a. The primary 12 and tertiary 16 surfaces are co-located, and the secondary 14 and quaternary 18 surfaces are co-located. A flat focal plane array 22 is located between the co-located primary 12 and tertiary 16 surfaces and the co-located secondary 14 and quaternary 18 surfaces.

FIG. 12c presents twelve spot diagrams for the wide FOV telescope 10 having a 3.5 m aperture, over a 4.0° field of view, as described in FIGS. 12a and 12b, with the surface image taken at the focal plane array 22. In general, spot diagrams are a method of evaluating image quality whereby a large number of rays are traced through a lens from a single object point. The intersections of the rays with the focal plane are then plotted and analyzed. The first spot diagram of FIG. 12c is taken on-axis, with each successive spot diagram taken a designated number of degrees off-axis, until 2.0 degrees off-axis is reached. Similarly, the first spot diagram is indicated as being 0.000 mm off-axis, with each successive spot diagram further off-axis. The last spot diagram is 183.972 mm off-axis. A dimensional scale of 5.00 microns is provided in the upper left portion of the spot diagrams of FIG. 12c. The diffraction limit 24 is shown on each spot diagram as a circle.

Figure 13A:
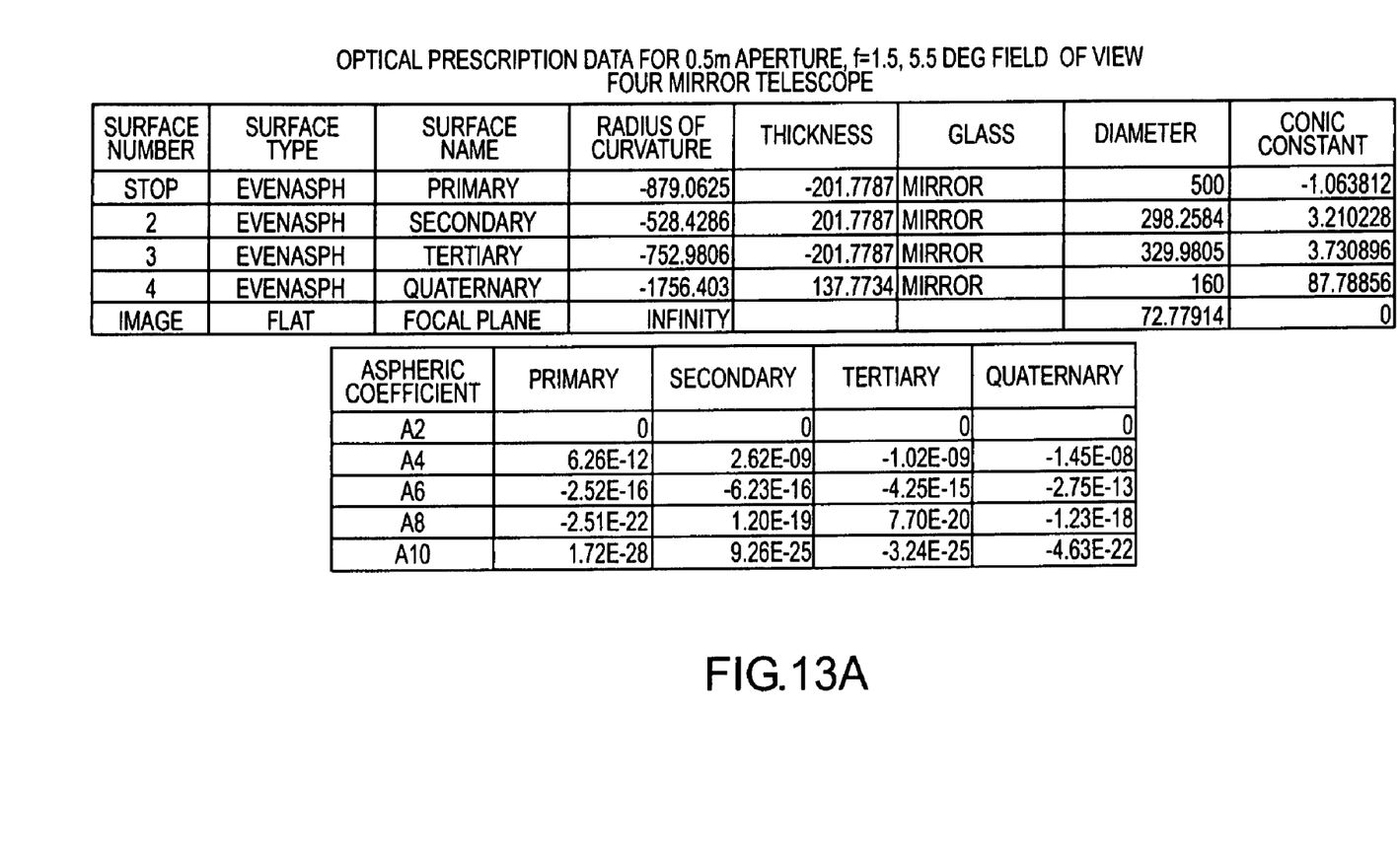
FIG. 13*a* provides optical prescription data for a 0.5 m aperture, 5.5° wide field of view telescope.
Figure 13B:
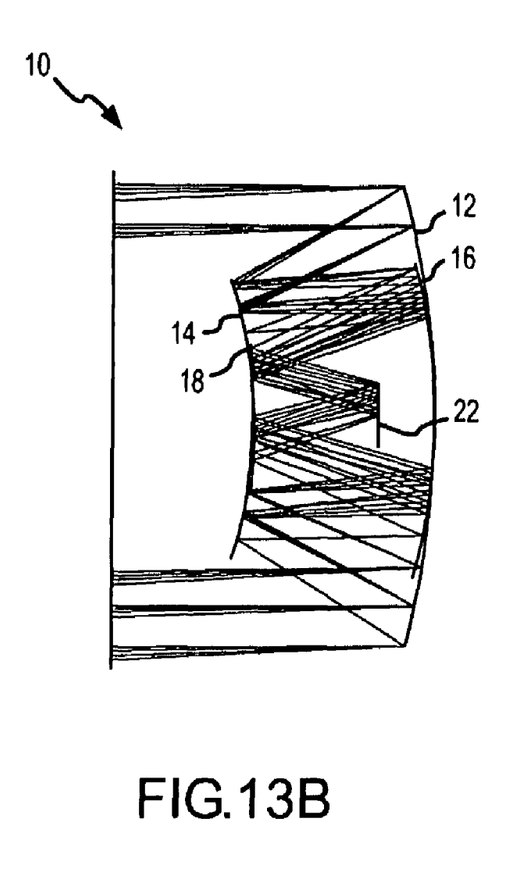
FIG. 13*b* provides a ray trace diagram for the wide field of view telescope of FIG. 13*a*.
Figure 13C:
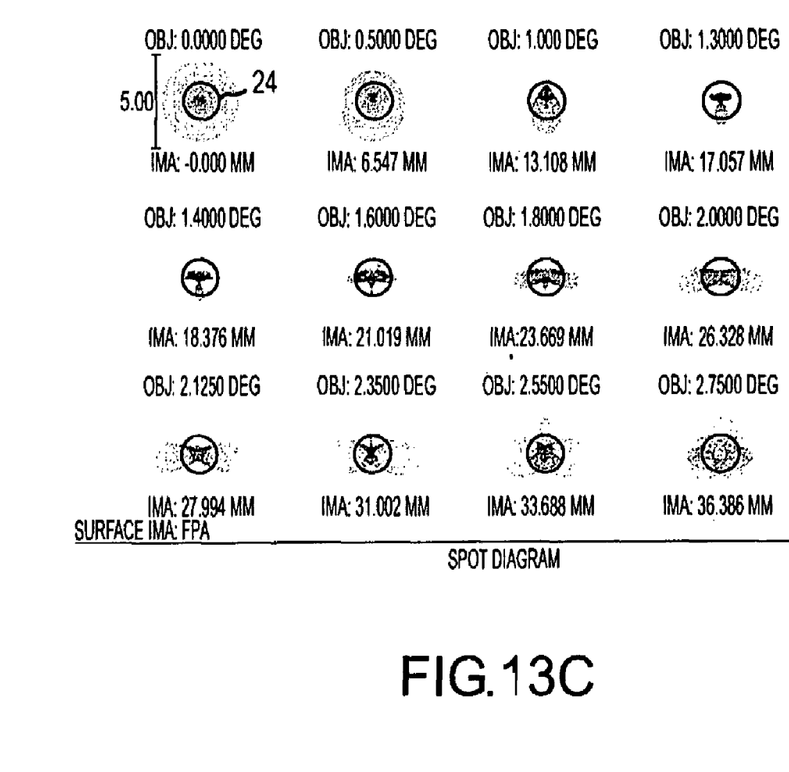
FIG. 13*c* provides a spot diagrams for the wide field of view telescope of FIGS. 13*a* and 13*b*.

FIGS. 13a, 13b, and 13c provide optical prescription data, ray trace diagram, and spot diagrams respectively for another wide FOV telescope configuration 10 from commercial optical ray-tracing software. This configuration is also similar to the configuration of FIG. 1 except that the diameter of the tertiary surface is slightly larger than that of the secondary surface. The optical prescription data shown in FIG. 13a is for 0.5 m aperture, having a focal ratio (f)=1.5, and a 5.5° FOV. The upper chart provides surface number and type, surface name, radius of curvature, surface thickness, type of surface, surface diameter, and conic constant. The aspheric coefficient for the primary, secondary, tertiary, and quaternary surfaces is provided in the lower chart of FIG. 13a, from which Sag may be calculated via equation (1).

FIG. 13b shows the ray trace diagram for the wide FOV telescope configuration 10 having the optical prescription data presented in FIG. 13a. The primary 12 and tertiary 16 surfaces are co-located, and the secondary 14 and quaternary 18 surfaces are co-located. A flat focal plane array 22 is located between the co-located primary 12 and tertiary 16 surfaces and the co-located secondary 14 and quaternary 18 surfaces.

FIG. 13c presents twelve spot diagrams for the wide FOV telescope configuration 10 having a 0.5 m aperture, over a 5.5° field of view, as described in FIGS. 13a and 13b with the surface image taken at the focal plane array 22. The first spot diagram of FIG. 13c is taken on-axis, with each successive spot diagram taken a designated number of degrees off-axis, until 2.75 degrees off-axis is reached. Similarly, the first spot diagram is indicated as being 0.000 mm off-axis, with each successive spot diagram further off-axis. The last spot diagram is 36.386 mm off-axis. A dimensional scale of 5.00 microns is provided in the upper left portion of the spot diagrams of FIG. 13c. The diffraction limit 24 is shown on each spot diagram as a circle.

The wide field of view telescope configurations described above provide excellent image quality. The design is extremely compact, having a length along the optical axis from the first to the last mirror, on the order of, or even less than, the diameter of the largest mirror. This feature is significant for applications that require fast slewing of the telescope followed by rapid damping of vibrations. Other designs are longer and require larger mounts or require a longer period to time to damp vibrations.

Implementation of an all-reflective design allows operation from ultraviolet to long infrared wavelengths. Other wide field designs require corrector lenses, which limit the range of wavelengths over which the system can operate.

A plurality of the wide FOV telescopes, such as those described above, can be used in combination to create a telescope system for detecting and tracking LEO objects, and conducting astronomical research. Such a system could be used to generate initial track information sufficient for acquisition and fine tracking by more traditional slewing telescopes.

EXAMPLES

Figure 14:
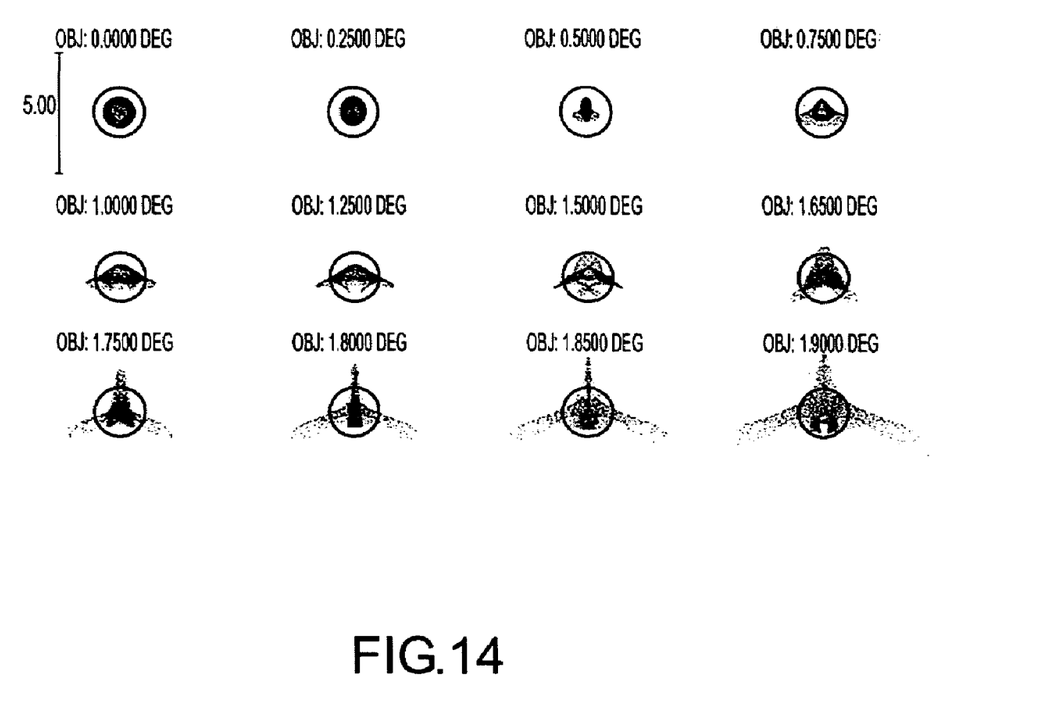
FIG. 14 provides spot diagrams for a typical 3.5 m aperture wide field of view telescope with near diffraction limited performance over a 3.8° field of view.

The performance of several other wide FOV telescope designs were explored with commercial optical ray-tracing software with encouraging results. Working with a 3.5 m aperture, designs ranged from having diffraction limited performance over a 3.8° FOV to systems with up to a 6.5° FOV and 0.8 arcsec geometric spot diameters. Some of the data from these systems are presented here as examples. FIG. 14 provides spot diagrams for a typical 3.5 m design with near diffraction limited performance over a 3.8° FOV.

Some of the design options investigated are summarized in Table I. All of the information in Table I, FIG. 15, and FIG. 16 was taken from published designs, scaled to a 3.5 m aperture and re-optimized where necessary.

TABLE I

| Focal Plane | Focal Ratio | Description |
| --- | --- | --- |
| Flat | 1.8 | Wide FOV Telescope |
| Flat | 1.5 | Wide FOV Telescope |
| Flat | 1.25 | Scaled LSST* |
| Flat | 5.0 | Scaled Sloan |
| Flat | 0.77 | Scaled KiwiStar Like |
| Flat | 2.6 | Willstrop Scaled |
| Curved | 1.0 | DARPA** SST*** Like |
| Curved | 1.5 | China Design Scaled |
| Curved | 1.6 | Willstrop Scaled |

Figure 15:
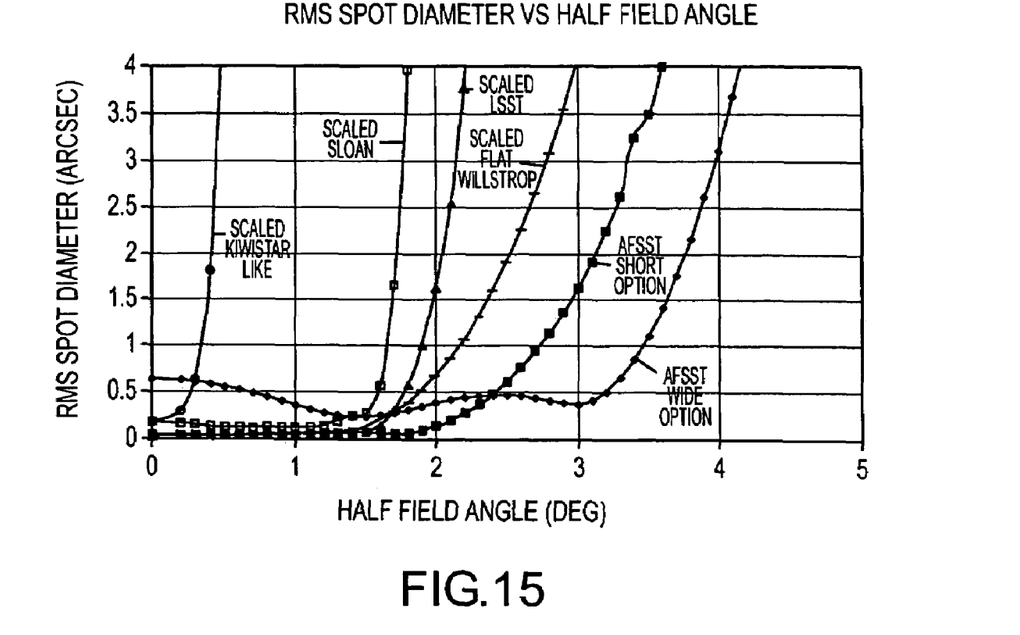
FIG. 15 illustrates RMS spot diameter in arcsec vs. half field angle for six telescope systems, each with flat focal planes.
Figure 16:
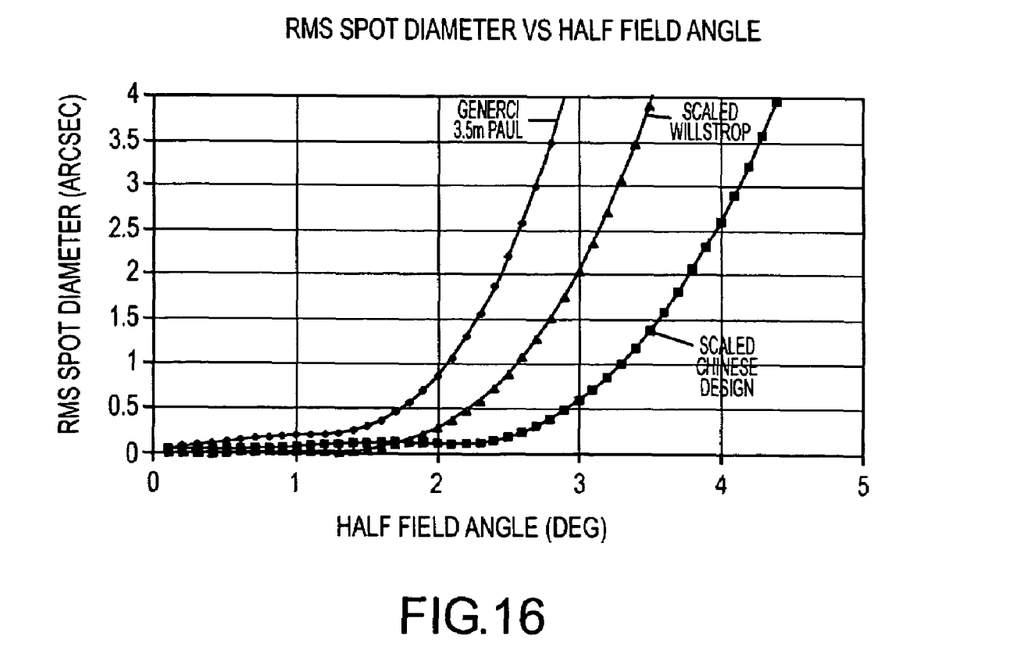
FIG. 16 illustrates RMS spot diameter in arcsec vs. half field angle for three telescope systems, each with curved focal planes.

*Large Synoptic Survey Telescope
**Defense Advance Research Projects Agency
*Space Surveillance Telescope To compare the telescope designs presented in Table I, their optical performance is plotted on a common chart. The selected performance measure was root-mean-square (RMS) spot diameter measure in arc seconds. FIG. 15 is a plot of results for the designs having flat focal planes, where "AFSST Short Option" refers to the wide FOV telescope of Table I having a focal ratio of 1.5, and "AFSST Wide Option" refers to the wide FOV telescope of Table I having a focal ratio of 1.8. FIG. 16 is a plot of results for the designs having curved focal planes. FIGS. 15 and 16** show the spot diameter plotted against the half field angle in degrees.

Some of the foregoing designs experienced graceful vignetting as field angle increased while others, such as the KiwiStar did not without significant redesign. The wide FOV telescope described herein exhibited constant illumination with field angle. These results suggest that the wide FOV telescope can also provide improved performance over a wider and flatter surface than some competing designs exhibit over more narrow, curved surfaces.

The foregoing presents embodiments for a telescope optimized for blind LEO satellite searching and astronomical research. A telescope having a wide FOV, fast focal ratio, and flat focal surface provides the best solution for these types of applicants. The telescope described herein provides excellent image quality and the ability to operate at infrared wavelengths when necessary.

The foregoing description illustrates exemplary implementations, and novel features, of a wide FOV telescope. There are many aspects to this telescope, because it may involve interaction between numerous components of a telescope system. While some suggestions are provided for alternative uses and implementations of the method and system, it is of course not practical to exhaustively list or describe such alternatives. Accordingly, the scope of the wide FOV telescope should be determined only be reference to the appended claims, and should not otherwise be limited by features illustrated herein except insofar as such limitation is recited in an appended claim.

While the above description has pointed out novel features of the disclosed wide FOV telescope, the skilled person will understand that various omissions, substitutions, and changes in the form and details of the wide FOV telescope illustrated may be made without departing from the telescope described herein.

Each practical and novel combination of the elements described hereinabove, and each practical combination of equivalents to such elements, is contemplated as an embodiment of the wide FOV telescope. Partly because many more element combinations are contemplated as embodiments than can reasonably be explicitly enumerated herein, the scope of the wide FOV telescope is properly defined by the appended claims rather than by the foregoing description. Furthermore, any operable possible combination of features described above should be considered as having been expressly and explicitly disclosed herein. All various coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A wide field of view telescope, comprising:
a primary reflective surface having an aspheric concave surface contour;
a secondary reflective surface having an aspheric concave surface contour;
a tertiary reflective surface having an aspheric concave surface contour;
and
a quaternary reflective surface having an aspheric concave surface contour,
wherein the quaternary, tertiary, secondary, and primary reflective surfaces are progressively farther from a flat focal plane along an optical path, wherein the primary, secondary, tertiary, and quaternary reflective surfaces are rotationally symmetric about an optical axis, wherein the primary, secondary, tertiary, and quaternary reflective surfaces create the flat focal plane, and wherein the wide field of view telescope is a direct-imaging system wherein a single image is formed which is located at the flat focal plane.

2. The wide field of view telescope of claim 1 wherein the primary reflective surface comprises a radius of curvature of approximately −6433.974, a conic constant of approximately −1.123517, and aspheric coefficients of approximately $A_2=0$, $A_4=1.03E-13$, $A_6=-1.51E-20$, $A_8=-4.00E-28$, and $A_{10}=9.23E-36$.

3. The wide field of view telescope of claim 1 wherein the secondary reflective surface comprises a radius of curvature of approximately −3745.918, a conic constant of approximately 3.083615, and aspheric coefficients of approximately $A_2=0$, $A_4=7.42E-12$, $A_6=-7.57E-20$, $A_8=1.07E-25$, and $A_{10}=1.32E-32$.

4. The wide field of view telescope of claim 1 wherein the tertiary reflective surface comprises a radius of curvature of approximately −4986.262, a conic constant of approximately 3.026096, and aspheric coefficients of approximately $A_2=0$, $A_4=-1.58E-12$, $A_6=-2.39E-19$, $A_8=5.46E-26$, and $A_{10}=-1.74E-33$.

5. The wide field of view telescope of claim 1 wherein the quaternary reflective surface comprises a radius of curvature of approximately −11308.44, a conic constant of approximately 120.0527, and aspheric coefficients of approximately $A_2=0$, $A_4=-2.08E-11$, $A_6=-4.88E-18$, $A_8=1.91E-24$, and $A_{10}=0$.

6. The wide field of view telescope of claim 1 wherein the primary reflective surface comprises a radius of curvature of approximately −879.0625, a conic constant of approximately −1.063812, and aspheric coefficients of approximately $A_2=0$, $A_4=6.26E-12$, $A_6=-2.52E-16$, $A_8=-2.51E-22$, and $A_{10}=1.72E-28$.

7. The wide field of view telescope of claim 1 wherein the secondary reflective surface comprises a radius of curvature of approximately −528.4286, a conic constant of approximately 3.210228, and aspheric coefficients of approximately $A_2=0$, $A_4=2.62E-09$, $A_6=-6.23E-16$, $A_8=1.20E-19$, and $A_{10}=9.26E-25$.

8. The wide field of view telescope of claim 1 wherein the tertiary reflective surface comprises a radius of curvature of approximately −752.9806, a conic constant of approximately 3.730896, and aspheric coefficients of approximately $A_2=0$, $A_4=-1.02E-09$, $A_6=-4.25E-15$, $A_8=7.70E-20$, and $A_{10}=-3.24E-25$.

9. The wide field of view telescope of claim 1 wherein the quaternary reflective surface comprises a radius of curvature of approximately −1756.403, a conic constant of approximately 87.78856, and aspheric coefficients of approximately $A_2=0$, $A_4=-1.45E-08$, $A_6=-2.75E-13$, $A_8=-1.23E-18$, and $A_{10}=-4.63E-22$.

10. The wide field of view telescope of claim 1 wherein the telescope comprises a field of view in the range of approximately 3.8° to approximately 6.5°.

11. The wide field of view telescope of claim 10 wherein the telescope comprises a field of view of approximately 4°.

12. The wide field of view telescope of claim 10 wherein the telescope comprises a field of view of approximately 5.5°.

13. The wide field of view telescope of claim 1 wherein the telescope comprises a focal ratio in the range of approximately 0.77 to approximately 5.0.

14. The wide field of view telescope of claim 13 wherein the telescope comprises a focal ratio in the range of approximately 1.5 to approximately 1.8.

15. The wide field of view telescope of claim 1 wherein the telescope comprises an aperture in the range of approximately four inches to approximately ten meters.

16. The wide field of view telescope of claim 1 further comprising a filter.

17. The wide field of view telescope of claim 1 further comprising a dewar window.

18. The wide field of view telescope of claim 1, wherein the length of the telescope along the optical axis is less than or equal to the largest reflective surface diameter.

19. The wide field of view telescope of claim 1 wherein the diameters of the primary, secondary, tertiary, and quaternary reflective surfaces are successively smaller.

20. The wide field of view telescope of claim 1 wherein the diameter of the primary reflective surface is larger than the secondary, tertiary, and quaternary reflective surfaces.

21. The wide field of view telescope of claim 20 wherein the diameter of the secondary and tertiary reflective surfaces are approximately equal.

22. A method of obtaining a wide field of view telescopic image, the method comprising:
reflecting a ray from a primary reflective concave surface having an aspheric surface contour;
reflecting a ray from a secondary reflective concave surface having an aspheric surface contour;
reflecting a ray from a tertiary reflective concave surface having an aspheric surface contour;
reflecting a ray from a quaternary reflective concave surface having an aspheric surface contour; and
creating a flat focal plane with the primary, secondary, tertiary, and quaternary reflective surfaces; wherein the primary, secondary, tertiary, and quaternary reflective surfaces are rotationally symmetric about an optical axis, wherein the primary, secondary, tertiary, and quaternary reflective surfaces form a direct-imaging optical system that forms a single image which is located at the flat focal plane.

23. The method of claim 22 further comprising creating a field of view in the range of approximately 3.8° to approximately 6.5° with the primary, secondary, tertiary, and quaternary reflective surfaces.

24. The method of claim 22 further comprising creating a field of view of approximately 4° with the primary, secondary, tertiary, and quaternary reflective surfaces.

25. The method of claim 22 further comprising creating a field of view of approximately 5.5° with the primary, secondary, tertiary, and quaternary reflective surfaces.

26. The method of claim 22 further comprising creating a fast focal ratio in the range of approximately 0.77 to approximately 5.0 with the primary, secondary, tertiary, and quaternary reflective surfaces.

27. The method of claim 22 further comprising creating a fast focal ratio in the range of approximately 1.5 to approximately 1.8 with the primary, secondary, tertiary, and quaternary reflective surfaces.

28. A system of wide field of view telescopes, comprising:
a plurality of wide field of view telescopes, each of the telescopes comprising:
a primary reflective surface having an aspheric concave surface contour;
a secondary reflective surface having an aspheric concave surface contour;
a tertiary reflective surface having an aspheric concave surface contour;
and
a quaternary reflective surface having an aspheric concave surface contour,
wherein the quaternary, tertiary, secondary, and primary reflective surfaces are progressively farther from a flat focal plane along an optical path, wherein the primary, secondary, tertiary, and quaternary reflective surfaces are rotationally symmetric about an optical axis, wherein the primary, secondary, tertiary, and quaternary reflective surfaces create the flat focal plane, and wherein each of the wide field of view telescopes is a direct-imaging system wherein a single image is formed which is located at the flat focal plane.

* * * * *